[19] United States Patent
Hibbard et al.

[11] Patent Number: 4,962,419
[45] Date of Patent: Oct. 9, 1990

[54] DETAIL PROCESSING METHOD AND APPARATUS PROVIDING UNIFORM PROCESSING OF HORIZONTAL AND VERTICAL DETAIL COMPONENTS

[75] Inventors: Robert H. Hibbard, Fairport; Kenneth A. Parulski; Lionel J. D'Luna, both of Rochester, all of N.Y.

[73] Assignee: Eastman Kodak Company, Rochester, N.Y.

[21] Appl. No.: 310,456

[22] Filed: Feb. 13, 1989

[51] Int. Cl.$^5$ .............................................. H04N 9/64
[52] U.S. Cl. .......................................... 358/37; 358/41
[58] Field of Search ........................ 358/37, 32, 41, 30

[56] References Cited

U.S. PATENT DOCUMENTS

| | | | |
|---|---|---|---|
| 3,340,356 | 9/1967 | James | 358/37 |
| 3,828,121 | 8/1974 | Brandinger et al. | 358/47 |
| 3,952,327 | 4/1976 | Hofman et al. | 358/37 |
| 3,971,065 | 7/1976 | Bayer | 358/41 |
| 4,148,059 | 4/1979 | Dillon et al. | 358/37 |
| 4,246,610 | 1/1981 | Takahashi | 358/167 |
| 4,268,855 | 5/1981 | Takahashi | 358/36 |
| 4,281,338 | 7/1981 | Takahashi et al. | 358/44 |
| 4,282,547 | 8/1981 | Morishita | 358/44 |
| 4,339,771 | 7/1982 | Morishita et al. | 358/41 |
| 4,415,923 | 11/1983 | Noda | 358/41 |
| 4,422,094 | 12/1983 | Lewis | 358/37 |
| 4,504,864 | 3/1985 | Anastassiou et al. | 358/167 |
| 4,520,396 | 5/1985 | Dischert et al. | 358/167 |
| 4,609,938 | 9/1986 | Suzuki et al. | 358/21 R |
| 4,661,987 | 4/1987 | Anderson et al. | 358/21 R |
| 4,663,661 | 5/1987 | Weldy et al. | 358/44 |
| 4,672,430 | 6/1987 | Asaida | 358/37 |
| 4,823,190 | 4/1989 | Yamamoto | 358/37 |

OTHER PUBLICATIONS

"Improved Signal Processing Techniques for Color Television Broadcasting", McMann & Goldberg, SMTE, vol. 77, 3/68, pp. 221-228.

Primary Examiner—John W. Shepperd
Attorney, Agent, or Firm—David M. Woods

[57] ABSTRACT

In a signal processing network including a color correction matrix and gamma compensation, detail processing is disclosed that includes a detail extraction circuit for generating a detail signal from an un-matrixed green signal and a detail enhancement circuit for adding the detail signal to the matrixed, gamma-corrected red, green and blue signals. The un-matrixed green signal is converted to a gamma-corrected green signal and separately input to vertical and horizontal high pass filters, which separate detail components representative of vertical and horizontal detail, respectively. The vertical detail is additionally input to a horizontal low pass filter to eliminate excessive enhancement of diagonal image components. The detail components are cored and input to the detail enhancement circuit. As a result of bypassing the color correction matrix and inserting the modified detail, including the diminished diagonal contribution, into the signal channel after gamma correction, the various detail components receive a substantially uniform visual enhancement regardless of orientation or density in the image.

12 Claims, 4 Drawing Sheets

DETAIL PROCESSING METHOD AND APPARATUS PROVIDING UNIFORM PROCESSING OF HORIZONTAL AND VERTICAL DETAIL COMPONENTS

BACKGROUND OF THE INVENTION

1. Field of the Invention

This invention relates to processing of image signals for detail improvement and noise reduction and, more specifically, to detail processing apparatus and method that operate separately upon horizontal and vertical detail.

2. Description Relative to the Prior Art

It is sometimes desirable to operate separately upon vertical and horizontal detail in an image. For example, it is easier to design separable processing into a real time, pipelined digital architecture. Sometimes, it may be advantageous to separately modify the vertical and horizontal detail signals by a non-linear process, e.g., by coring the digital signals, before combining the modified detail with the image signals.

In U.S. Pat. No. 4,609,938, a digital luminance processing circuit generates vertical and horizontal contour signals that are separately modified and added to a luminance signal. The vertical contour circuit includes a series arrangement of a vertical high pass filter and a low pass filter. The vertical high pass filter includes delay lines for processing three adJacent lines in order to filter out a component having a large vertical variation (on a TV screen). The low pass filter operates on the vertical contour signal to eliminate the chrominance subcarrier component by calculating a linear combination of image samples weighted so as to cancel the chrominance subcarrier.

Separating vertical and horizontal detail processing works well with detail that has either a predominant vertical or horizontal orientation. One or the other detail circuit will detect the detail and provide a corresponding detail output. Diagonally-oriented detail, however, gets doubly-enhanced in such a system because diagonal detail has both vertical and horizontal components. Each are separately detected and both circuits provide corresponding output, thus—when combined—doubling the boost for diagonal detail relative to vertical or horizontal detail and thereby creating undesirable artifacts in the image.

It is desirable to use a "detail out of green" approach for edge enhancement, since there are ordinarily more green samples to work with and the green record has less noise and artifacts. The green record also corresponds to the peak visual response, so that the eye is more receptive to detail in green. To implement such an approach, the green channel is tapped for detail at an appropriate point, the detail is processed, and the processed detail is re inserted into the channel. In cameras with sophisticated signal processing, a color correction matrix corrects the spectral sensitivities of the image sensor for the chromaticities of the display. However matrixing the green signal changes the green signal in relation to the sensor signal level and increases the noise in the green channel, depending on the magnitude of the "red into green" and "blue into green" matrix terms. This means that using the matrixed green signal as input for signal enhancement tends to enhance the noise as well as the detail. The contrary approach, that of enhancing the green signal prior to color matrixing, also has drawbacks. The matrix is intended to remove unwanted color sensitivities, i.e., color crosstalk, which are not scene-dependent. Adding a scene dependent gain adJustment (such as a detail boost) affects this complex interrelationship in a way the color matrix is not designed to handle—in effect adding a scene-dependent component that cannot be fully removed by the matrix.

An article by R. H. McMann, Jr. and A. A. Goldberg ("Improved Signal Processing Techniques for Color Television Broadcasting", Journal of the SMPTE, March 1968, pp. 221-228) represents a partial solution to this problem (in an analog processing system). In the McMann and Goldberg article, a "contour out of green" image enhancement approach is disclosed in which an image enhancer is installed in the green channel between the camera and an electronics unit. The detail signal from the image enhancer is fed into the R, G, B output channels of a masking amplifier, which provides a first order cross matrix correction for colorimetric errors due to the difficulty of exactly realizing the three color channel spectral response curves called for by theory. The green channel is tapped for detail prior to matrixing, that is, prior to increasing noise in the green channel; then the processed detail is added back after matrixing, thus not inserting a scene-dependent variable into the matrix. In a live camera, the masking amplifier is inserted in the signal path ahead of gamma conversion and performs a masking function in linear space. In a film camera, the masking amplifier is inserted after gamma correction and performs a masking function in gamma space, since this location provides a certain amount of multiplicative coupling to help compensate for the non-linear cross coupling of the film dyes. In both cases, the detail is extracted from the green channel prior to masking, i.e., either in linear or gamma space as dictated by the masking function. Then the processed detail is added back in the same space.

The problem with the McMann and Goldberg approach lies in the different requirements of edge enhancement relative to color correction. Color correction matrixing is an additive correction process that should be done in linear space for best effect. Edge enhancement, on the other hand, should provide a subJective sharpness improvement equally perceptible in black portions as in white portions of the displayed picture. In terms of the linear video signal provided by the sensor, this is a non-linear multiplicative operation on the signal, which is difficult to accomplish. Therefore, linear space edge enhancement excessively boosts detail in the dense parts of the image. In combination with the problem noted with diagonal detail, present detail processing techniques that must operate in conjunction with a colorimetric correction process tend to introduce artifacts in the image, either due to detail orientation or to density variations in the image detail.

SUMMARY OF THE INVENTION

The invention provides substantially uniform processing of vertical and horizontal detail components in a signal processing network employing color correction matrixing for colorimetric errors and gamma correction for contrast non-linearity. The detail processing initially converts the unmatrixed luminance signal into a gamma-corrected luminance signal, which is input to a vertical high pass filter and a horizontal high pass filter. The vertical filter separates a vertical detail signal representative of vertical components, which is then low pass filtered in a horizontal filter to eliminate variations caused by diagonal components of the image. The horizontal high pass filter separates a horizontal detail signal representative of horizontal components. The horizontally-filtered vertical detail signal and the horizontal detail signal are modified in a process having a transfer characteristic that is related to the signal level of the image detail. As a result of bypassing the color correction matrix and inserting the modified detail, including the diminished diagonal contribution, into the signal channel after gamma correction, the various detail components receive a substantially uniform boost regardless of orientation or density in the image.

BRIEF DESCRIPTION OF THE DRAWINGS

The invention will be described in relation to the drawings, in which.

DETAILED DESCRIPTION OF THE INVENTION

Figure 1:
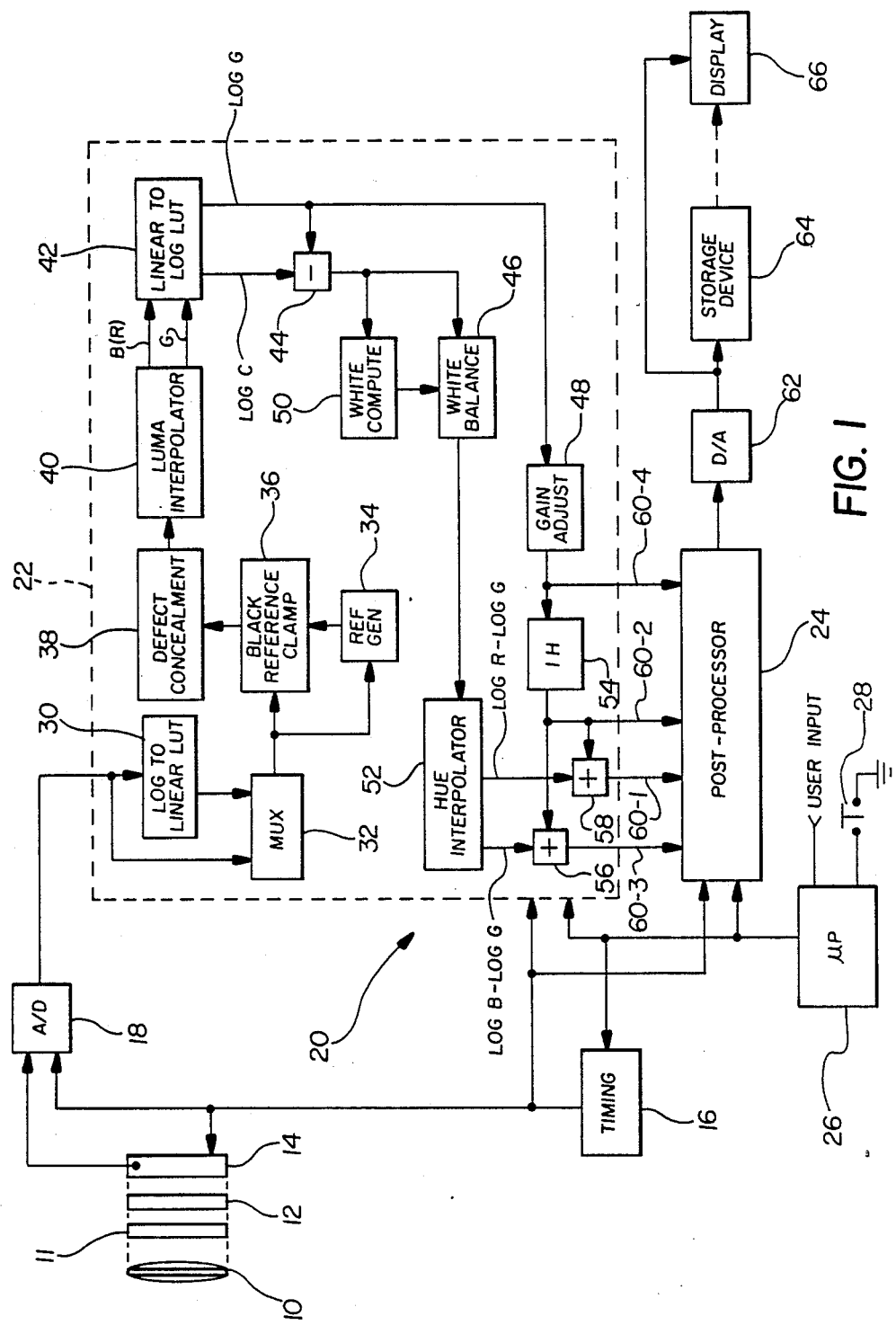
FIG. 1 is a block diagram showing a video camera including a digital post-processor for processing image detail according to the invention.

FIG. 1 identifies the basic elements of a video camera including detail processing as taught by the invention. The layout of the camera generally parallels the architecture disclosed in copending Ser. No. 310,419, entitled "Real-Time Digital Processor for Producing Full Resolution Color Signals from a Multi-Color Image Sensor", which is filed concurrently herewith and assigned to the same assignee as the present invention. Elements of the camera, either omitted or not shown in detail, may be readily selected from like elements known in the art. The microprocessor control system and the timing circuit may be implemented in a wholly conventional manner using available components and techniques. Moreover, although the detail processing circuit is disclosed in connection with a video camera, the invention is not necessarily limited to this, or any, mode of image capture and, for example, could be incorporated generally in image processing systems without regard to the source of the image signals.

Figure 2:
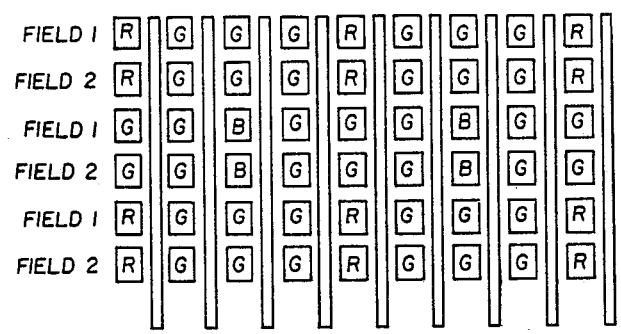
FIG. 2 is a diagram of the color filter array shown in connection with the video camera illustrated in FIG. 1.

Referring to FIG. 1, the video camera includes an optical section 10 for directing image light from a subject (not shown) through an anti-aliasing or blurring filter 11 and a color filter 12 to an image sensor 14. FIG. 2 shows a color filter geometry for the color filter 12, specifically a "three-green" color filter of the type disclosed in U.S. Pat. No. 4,663,661, which is assigned to the assignee of the present invention and incorporated by reference into the present application. A sensor having this type of filter produces a sequence of red or blue signals separated by three green signals, which can also be considered a chrominance (red or blue) signal separated by three luminance (green) signals. To implement the type of luminance interpolation disclosed in U.S. Pat. No. 4,663,661, the blurring filter 11 is included to prefilter the image light according to a known spread function, which then is incorporated into the design of the interpolation filter, as disclosed in that patent. The "three-green" color filter array is additionally arranged in a "checkerboard" geometry according to the teaching of U.S. Pat. No. 3,971,065, which is also assigned to the assignee of the present invention. It is to be noted that, with this particular color filter, luminance is interpolated horizontally while chrominance must be interpolated vertically as well as horizontally. This particular color filter array, however, is disclosed only by way of example and has no necessary relationship to the detail processing, inasmuch as detail processing operates on an input luminance signal, regardless of the color geometry of the source.

A timing circuit 16 is provided for clocking the image signal from the output register of the image sensor 14 to an analog-to-digital (A/D) converter circuit 18 and for generally sequencing other sections of the camera. The digital signal generated by the A/D converter 18 is a linearly quantized stream of color signals comprising a sequence of quantized red (or blue) signals separated by quantized green signals. The quantized color signals are applied to a digital signal processing circuit 20 composed of two sections: a pre-processor section 22 and a post-processor section 24, the latter of which includes detail processing according to the invention. (The signal input to the pre processor 22 can also be a non-linearly quantized, e.g., log quantized, input signal. In that case the A/D converter 18 would be preceded by a log amplifier to provide log signals to the converter 18.) The signal output from the circuit 20 is a fully corrected, full resolution multi-color digital signal.

As disclosed in co pending Ser. No. 310,419, the pre-processor 22 is fully pipelined so that red, green and blue data from the image sensor 14 is processed and provided to the post-processor 24 in real time, that is, without the need for any external storage, such as a framestore. It is further envisioned that post-processing (in the post-processor 24) would also be in real time, but that is not a necessary adjunct of real time processing in the pre-processor 22. However, as noted earlier, separability of vertical and horizontal detail is often advantageous in a pipelined, real time system. Consequently, the post-processor 24 is intended to be a real time digital processing circuit. ("Real time" includes the normal video operating rate of the image sensor 14, i.e., sixty video fields per second, or any comparable rate that is rapid enough to permit ordinary photography.) A microprocessor 26 controls the operation of the pre-processor 22 and the post-processor 24, and allows for user entry of pre-processing information, such as gain offset, to the pre-processor 22.

FIG. 1 shows the basic architecture of the digital pre-processor 22. The pre-processor 22 receives either linearly quantized or non-linearly (log) quantized signals from the A/D converter 18. A read only memory (ROM) look-up table (LUT) 30 maps from the non-linearly quantized (log) input signal to a linear signal value. A multiplexer 32 has two inputs, one connected to the A/D converter 18 and the other to the ROM 30. The multiplexer 32 is switched by the microprocessor 26 (or hard-wired for the application) according to the type of input signal, that is, whether the input signal is log or linear, thus providing an output that is always linear. This is important because the initial processing steps of black level clamping and luminance interpolation are desirably completed in linear space, where the adjustments will be in direct, linear relation to the charge signal amplitudes existing on the image sensor.

The signal from the multiplexer 32 is applied to a black reference generator 34 and to a black reference clamp 36, which are used to establish a stable sensor black reference value for the entire image. The black reference is an average thermal dark current noise correction offset value for the sensor, which, unless removed from the signals, will corrupt all subsequent adjustments and corrections. The black reference generator 34 is enabled by the timing circuit 16 before the image area of the sensor 14 is scanned in order to collect a sample of dark current signal values from non-displayed pixels on the image sensor 14. The black reference generator 34 calculates an average of these signal values and provides the calculated average to the clamp 36. As the image values of the pixels from the active image area are subsequently processed, the average black reference value is subtracted from each pixel value in the clamp 36.

The clamped signals are applied to a sensor defect concealment circuit 38, which conceals defective pixels by substituting the value of the closest previous horizontally adjacent pixel of the same color. The defective pixels are predetermined as to location by a defect table (not shown), which controls operation of the circuit 38. The stream of pixel signals is next applied to a luminance pixel interpolation circuit 40, which calculates a luminance value for that proportion (one quarter, in this case) of the pixel locations, namely, those collecting red and blue information, that are missing a luminance, or green, value. The interpolation circuit 40 interpolates a green value for these locations (the missing green pixels) by using a horizontal finite impulse response (FIR) digital filter of the type disclosed in the above-mentioned U.S. Pat. No. 4,663,661 and in copending Ser. No. 310,419. One output of the interpolator 40 is a full resolution luminance (green) signal, that is, a signal stream with green values for every pixel location. Since intermittent values (every fourth value, in this case) of the stream of signals input to the interpolator 40 are chroma (red or blue) signal values, the chroma values are separately output as a partial resolution chroma signal.

The full resolution interpolated green signal and the partial resolution chroma (red and blue) signal are transformed into an approximately logarithmically quantized space by a set of linear to log ROM look-up tables 42. This transformation is useful because the chroma processing is to involve hues, that is, the ratio of red or blue to green, rather than the red or blue values themselves. It is known that interpolating hue values rather than red or blue values greatly reduces false colors in areas with a significant amount of luminance detail. The ratio of red or blue to green is generated by subtracting the log green from the log chroma signals in a subtracting circuit 44, which provides a line sequence of log blue-log green and log red-log green signals (log hue signals). Next, the white balance and gain are adjusted. Respective white balance offset values are subtracted from the log blue-log green and log red-log green values in a white balance circuit 46 to achieve the proper white balance and a gain offset value is summed with the log green value in a gain circuit 48 to adjust the signal gain. The white balance offset value is obtained from white balance computation circuit 50, which computes the separate averages of a number of log blue-log green and log red-log green values (while the user is aiming the camera at a white card). The gain offset is input from the microprocessor 26 to the gain adjust circuit 48.

The log hue signals, following white balancing, are applied to a hue interpolation circuit 52. Because the red and blue color signals are separated by full lines in each field, the hue interpolation circuit 52 includes two line delays for operating on three lines of chroma. In practice, the circuit 52 is separated into a vertical hue interpolation section and a horizontal hue interpolation section as disclosed in the above-mentioned Ser. No. 310,419. The vertical interpolation section provides either the actual log hue signal value or an average of the adjacent log hue signal values. The vertically interpolated values are applied to respective log blue-log green, and log red-log green horizontal interpolator sections. The horizontal interpolation in each section is obtained by using a polyphase finite impulse response (FIR) filter to provide an interpolated log hue value for each luminance pixel location.

The output of the interpolator 52 is a full resolution log blue-log green (hue) signal and a full resolution log red-log green (hue) signal. Meanwhile, the log green signal has been delay equalized in a full line delay 54. The full resolution log blue-log green and log red-log green signals are respectively summed with the delayed log green signal in a blue addition circuit 56 and a red addition circuit 58. The output of these addition circuits plus the delayed log green signals comprise the output of the integrated circuit 22, namely, full resolution, uncorrected logarithmic red, green and blue signals provided at terminals 60-1, 60-2, and 60-3, respectively. In addition, the undelayed log green signal is provided at an output terminal 60-4.

Figure 3:
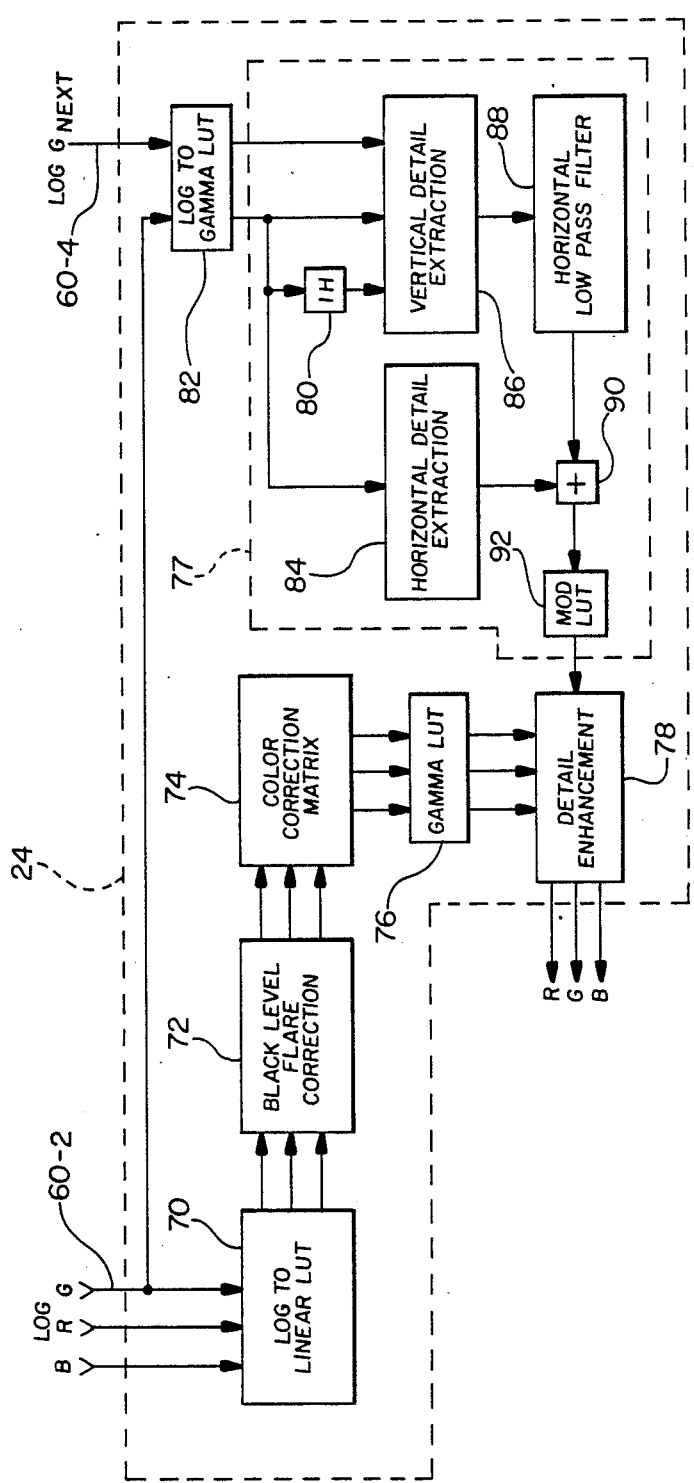
FIG. 3 is a detailed block diagram of the digital post-processor shown in FIG. 1.

The full resolution red, green and blue signals are subjected to a number of signal corrections and improvements in the post-processing circuit 24. The full resolution red, green and blue outputs of the circuit 24 is applied to a digital-to-analog (D/A) converter 62 which generates analog red, green and blue signals. The analog signals are stored in a storage device 64 and later displayed, or directly applied to a display 66. Referring now to FIG. 3, the logarithmic red, green and blue signals input to the post-processor 24 are transformed into linear signals in a linear ROM look-up table 70. The black level is corrected for lens flare by separately integrating the scene intensity in each color and then subtracting a certain percentage of this average (depending on the lens quality) from every pixel of the image in a correction circuit 72. The linearly quantized red, green, and blue signals are next matrixed in a color correction matrix 74 in order to properly correct the spectral sensitivities of the image sensor for the chromaticities of the output (such as the display 66, as shown in FIG. 1). The color correction matrix 74 provides a matrix transformation as follows (which is exemplary of a particular application only)

$$\begin{bmatrix} R' \\ G' \\ B' \end{bmatrix} = \begin{bmatrix} 13/8 & -1/4 & -3/8 \\ -1/16 & 20/16 & -1/4 \\ -1/32 & -1/2 & 49/32 \end{bmatrix} \begin{bmatrix} R \\ G \\ B \end{bmatrix}$$

wherein R, G, B are uncorrected red, green and blue values and R', G', B' are the corrected color values. It is noted that each corrected color includes a contribution from the other colors according to a known, predictable relationship between the chromaticities of the image sensor and the output display. Such contributions are system-dependent rather than scene-dependent.

(Detail processing, on the other hand, is highly scene-dependent). The matrixed red, green and blue signals are then gamma-corrected in a log to gamma ROM look-up table 76, which provides suitable curve shape transformations to adjust the non-linear contrast relationship between signal voltages at the input (sensor 14, FIG. 1) and the light values at the output (e.g. display 66, FIG. 1) of the system.

The gamma-corrected red, green and blue signals are next processed in a detail processing circuit to improve the subjective sharpness of the image. The detail processing circuit includes a detail extraction circuit 77 for generating a detail signal and a detail enhancement circuit 78 for adding the detail signal to the gamma-corrected red, green and blue signals. The detail signal is generated by the afore mentioned "detail out of green" approach. Two lines of green are provided directly from the pre-processor circuit 22 at terminals 60-2 and 60-4 and an additional line delay is added by a line delay circuit 80. Since the two green input signals are logarithmic, a log to gamma ROM look-up table 82 is provided to convert the log signals to gamma-corrected signals. As described earlier, un-matrixed green signals reduce the amount of noise that gets enhanced, since matrixing the green signal increases the noise in the green signal, depending on the magnitude of the "red into green" and "blue into green" matrix terms. Adding the detail signal back in gamma-corrected space insures that the detail boost affects black areas and white areas in a visually equal manner.

Figure 4:
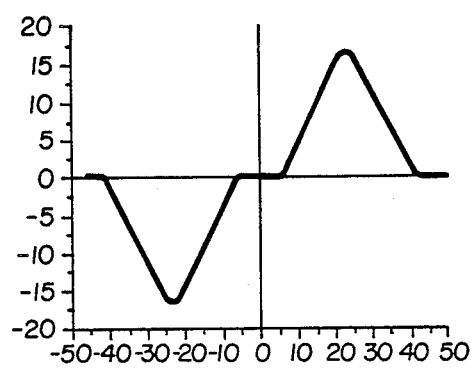
FIG. 4 is a diagram of the non-linear curve shape implemented by the coring circuit shown in FIG. 3.

Separate green detail signals are extracted in the horizontal and vertical directions by a horizontal detail extraction circuit 84 and a vertical detail extraction circuit 86, respectively. The vertical detail signal is then filtered with a horizontal low pass filter 88 to prevent diagonal detail from being doubly-enhanced. The horizontal and the filtered vertical detail signals are summed in a summing circuit 90 and the sum is modified in a mask-programmable ROM look-up table 92. The ROM 92 executes a process having a transfer characteristic that is related to the signal level of the image detail. This process may take several forms, ranging from a simple linear amplification of the detail to non-linear attenuation of the noise component in the detail. It may also include clipping of the detail signal at its noise level, thus providing a noise signal which is subtracted from the image signals in the detail enhancement circuit 78. In the preferred embodiment, the ROM 92 executes a non-linear coring process. The preferred look-up table curve shape is illustrated in FIG. 4, which shows that low level inputs from noise are set to zero, higher level signals are amplified to enhance edges, and very high level signals are attenuated to prevent over enhancement of strong edges. The non-linearly amplified green detail is then summed with the gamma-corrected red, green and blue signals in the edge enhancement circuit 78 to form the digital outputs of the post-processor 24.

Figure 5:
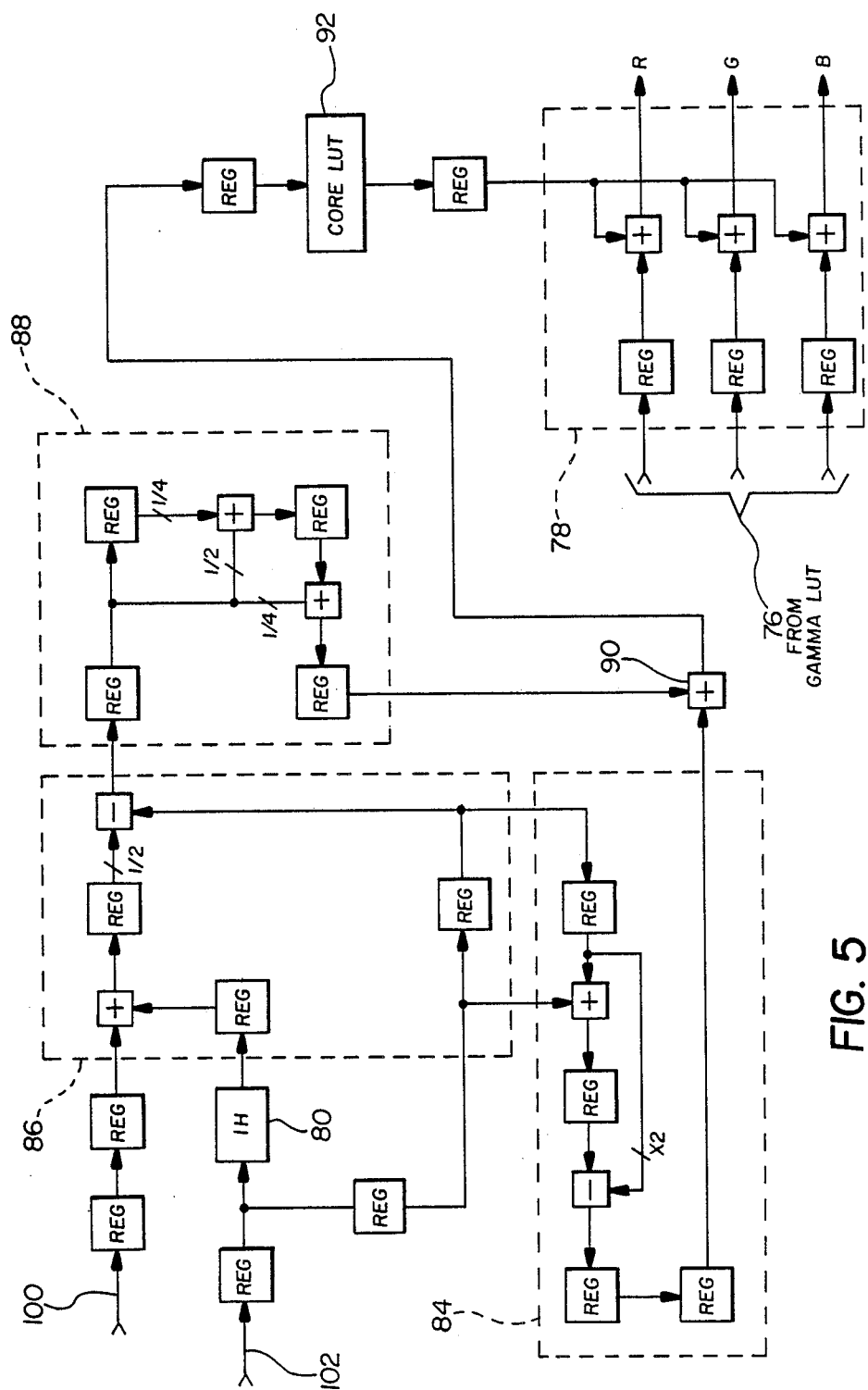
FIG. 5 is a detailed diagram of the edge enhancement circuit shown in connection with the post-processor illustrated in FIG. 3.

Further detail of the detail enhancement circuit 78 and the detail extraction circuit 77 is shown in FIG. 5. The circuit 77 is implemented in hard-wired form by adds, subtracts and a series of right-shifts (and left-shifts), from which binary division (and multiplication) is obtained. (The adds are denoted by "+", the differences by "−" and the right-shifts by a slash "/" with the binary division next to it. The registers denoted "REG" provide the necessary timing delay for pipelined operation.) The green signal from the terminal 60-4 of the pre-processor 22 is applied to the input line 100 and the line-delayed signal from the terminal 60-2 is applied to the input line 102. The vertical detail signal is obtained from a vertical finite impulse response (FIR) filter having the coefficients ($-0.5$, $+1.0$, $-0.5$) implemented with adds, subtracts and right shifts as shown within the block 86 in FIG. 5. The vertical detail is horizontally filtered through a horizontal low pass FIR filter having coefficients (0.25, 0.5, 0.25), also implemented with adds and right shifts as shown within the block 88 in FIG. 5. Meanwhile the horizontal detail is obtained with a horizontal high pass FIR filter with coefficients ($-1$, $+2$, $-1$) as shown within the block 84. The gain of the horizontal detail channel is double that of the vertical detail channel, in order to make up for the horizontal blurring which occurs in the optical anti-aliasing filter 11. According to one aspect of the invention, the combined effect of the vertical and horizontal components of diagonal detail "leaking" through the vertical detail circuit 86 and the horizontal detail circuit 84 is deemphasized by the horizontal low pass filter 88 acting upon vertical detail. For this to succeed, the horizontal filter 88 must "see" the diagonal component and therefore must operate on a linear combination of image samples properly spaced according to vertical and horizontal sample pitch and weighted for detection of the diagonal component. The close pattern of (0.25, 0.5, 0.25) is an example of such weighting. In the final result, the various detail components obtain substantially the same visual enhancement regardless of orientation or density in the image.

The invention has been described in detail with particular reference to a presently preferred embodiment, but it will be understood that variations and modifications can be effected within the spirit and scope of the invention. Although a detail processing circuit has been disclosed for processing a detail signal, the functions included in the disclosed circuit could be equivalently accomplished in the program of a computer. Therefore, the claims directed to an apparatus should be understood to include a programmed computer as well as the disclosed circuit, or the equivalents thereof.

What is claimed is:

1. Detail processing apparatus for improving the detail components of an image signal, the apparatus being part of a signal processing network in which separate luminance and chrominance signals are corrected for colorimetric errors in a correction matrix and compensated for contrast non-linearity in a gamma correction stage, said detail processing apparatus comprising:

means for converting the un-matrixed luminance signal to a gamma-corrected luminance signal;

a vertical high pass filter for filtering the un-matrixed, gamma-corrected luminance signal and separating therefrom a vertical detail signal representative of vertical components of the image;

a horizontal low pass filter for filtering the vertical detail signal for horizontal variations caused by diagonal components of the image and generating therefrom a filtered vertical detail signal;

a horizontal high pass filter for filtering the un-matrixed, gamma-corrected luminance signal and separating therefrom a horizontal detail signal representative of horizontal components of the image;

means for modifying the filtered vertical and the horizontal detail signals by a process having a transfer characteristic that is related to the signal level of image detail; and means for combining the modified detail signals with the matrixed, gamma-corrected image signals whereby the extracted detail bypasses the color correction matrix and is inserted into the signal channel after gamma correction, the various detail components obtaining substantially the same visual enhancement regardless of orientation or density in the image.

2. Detail processing apparatus as claimed in claim 1 in which the filtered vertical detail signal and the horizontal detail signal are summed together and the sum forms the input to said detail signal modifying means.

3. Detail processing apparatus as claimed in claim 2 in which said detail signal modifying means comprises a coring stage having a non-linear characteristic that amplifies image detail and attenuates noise.

4. Detail processing apparatus as claimed in claim 3 in which said coring stage has a transfer curve shape that eliminates low level input signals to provide a zero output, amplifies intermediate level input signals to provide an enhanced output, and attenuates high level input signals to prevent an over-enhanced output.

5. Detail processing apparatus as claimed in claim 1 in which said horizontal low pass filter operates on a linear, weighted combination of image samples that are spaced according to vertical and horizontal sample pitch so as to detect a diagonal component.

6. Detail processing apparatus for improving the detail components of an image signal, the apparatus being part of a signal processing network in which separate red, green and blue signals are corrected for colorimetric errors in a correction matrix and compensated for contrast non-linearity in a gamma correction stage, said detail processing apparatus comprising:
  means for converting the un-matrixed green signal to a gamma-corrected green signal;
  a vertical high pass filter for filtering the un-matrixed, gamma-corrected green signal and separating therefrom a vertical detail signal representative of vertical components of the image;
  a horizontal low pass filter for filtering the vertical detail signal for horizontal variations caused by diagonal components of the image and generating therefrom a filtered vertical detail signal;
  a horizontal high pass filter for filtering the un-matrixed, gamma-corrected green signal and separating therefrom a horizontal detail signal representative of horizontal components of the image;
  means for modifying the filtered vertical and the horizontal detail signals by a non-linear process having a non-linear transfer characteristic that is related to the signal level of image detail; and
  means for combining the modified detail signals with the matrixed, gamma-corrected image signals whereby the extracted detail bypasses the color correction matrix and is inserted into the signal channel after gamma correction, the various detail components obtaining substantially the same visual enhancement regardless of orientation or density in the image.

7. Detail processing apparatus as claimed in claim 6 in which the filtered vertical detail signal and the horizontal detail signal are summed together and the sum forms the input to said detail signal modifying means.

8. Detail processing apparatus as claimed in claim 7 in which said detail signal modifying means comprises a look up table having a non-linear characteristic that amplifies image detail and attenuates noise.

9. Detail processing apparatus as claimed in claim 8 in which said look up table executes a transfer curve shape that eliminates low level input signals to provide a zero output, amplifies intermediate level input signals to provide an enhanced output, and attenuates high level input signals to prevent an over-enhanced output.

10. A digital detail processing circuit for improving the detail components of a quantized image signal, the circuit being part of a digital signal processing network in which quantized red, green and blue signals are corrected for colorimetric errors in a correction matrix and compensated for contrast non-linearity in a gamma correction circuit, said detail processing circuit comprising:
  means for converting the un-matrixed green signal to a gamma-corrected green signal;
  a vertical high pass filter for filtering the un-matrixed, gamma-corrected green signal and separating therefrom a vertical detail signal representative of vertical components of the image;
  a horizontal low pass filter for filtering the vertical detail signal for horizontal variations caused by diagonal components of the image and generating therefrom a filtered vertical detail signal;
  a horizontal high pass filter for filtering the un-matrixed, gamma-corrected green signal and separating therefrom a horizontal detail signal representative of horizontal components of the image;
  means for combining the filtered vertical detail signal and the horizontal detail signal;
  a coring look-up table for modifying the combined detail signal by a non-linear process that amplifies at least some image detail and attenuates noise; and
  means for adding the modified detail signal to the quantized, matrixed, gamma-corrected red, green and blue signals whereby the extracted detail bypasses the color correction matrix and is inserted into the signal channel after gamma correction, the various detail components obtaining substantially the same visual enhancement regardless of orientation or density in the image.

11. A digital detail processing circuit as claimed in claim 10 in which said horizontal low pass filter operates on a linear combination of adjacent image samples that are weighted so as to detect a diagonal component.

12. A detail processing method for improving the detail components of an image signal, the method being part of a signal processing system in which separate luminance and chrominance signals are corrected for colorimetric errors by a matrix correction and compensated for contrast non-linearity by a gamma correction, said detail processing method comprising the steps of:
  converting the un-matrixed luminance signal to a gamma-corrected luminance signal;
  high pass filtering the un-matrixed, gamma-corrected luminance signal in the vertical direction and separating therefrom a vertical detail signal representative of vertical components of the image;
  low pass filtering the vertical detail signal for horizontal variations caused by diagonal components of the image and generating therefrom a filtered vertical detail signal;
  high pass filtering the un-matrixed, gamma-corrected luminance signal in the horizontal direction and separating therefrom a horizontal detail signal representative of horizontal components of the image;
  modifying the filtered vertical and the horizontal detail signals by a process having a transfer characteristic that is related to the signal level of image detail; and combining the modified detail signals with the matrixed, gamma-corrected image signals whereby the extracted detail bypasses the matrix correction and is inserted into the signal channel after gamma correction, the various detail components obtaining substantially the same visual enhancement regardless of orientation or density in the image.

* * * * *